US012641608B2

(12) United States Patent
Li et al.

(10) Patent No.: US 12,641,608 B2
(45) Date of Patent: May 26, 2026

(54) RESOURCE MAPPING METHOD AND APPARATUS AND DEVICE

(71) Applicant: VIVO MOBILE COMMUNICATION CO., LTD., Guangdong (CN)

(72) Inventors: Can Li, Guangdong (CN); Gen Li, Guangdong (CN); Huaming Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 343 days.

(21) Appl. No.: 18/212,028

(22) Filed: Jun. 20, 2023

(65) Prior Publication Data

US 2023/0337241 A1      Oct. 19, 2023

Related U.S. Application Data

(63) Continuation of application No. PCT/CN2021/142875, filed on Dec. 30, 2021.

(30) Foreign Application Priority Data

Dec. 31, 2020    (CN) .......................... 202011625353.2

(51) Int. Cl.
 *H04W 72/21* (2023.01)
 *H04W 72/0453* (2023.01)

(52) U.S. Cl.
 CPC ....... *H04W 72/21* (2023.01); *H04W 72/0453* (2013.01)

(58) Field of Classification Search
 CPC . H04W 72/21; H04W 72/0453; H04W 72/04; H04W 72/0457; H04W 72/232;
 (Continued)

(56) References Cited

U.S. PATENT DOCUMENTS 10,893,515 B2 * 1/2021 Myung ..................... H04L 5/00
11,463,204 B2 * 10/2022 Zhou ..................... H04L 1/1819
 (Continued)

FOREIGN PATENT DOCUMENTS

CN         103476120 A      12/2013
CN         109257150 A       1/2019
 (Continued)

OTHER PUBLICATIONS

International Search Report and Written Opinion for Application No. PCT/CN2021/142875, dated Mar. 30, 2022, 6 Pages.
 (Continued)

*Primary Examiner* — Brian T O'Connor
(74) *Attorney, Agent, or Firm* — BROOKS KUSHMAN P.C.

(57) ABSTRACT

A resource mapping method and apparatus and a device are provided. The method is applied to user equipment UE, and the method includes: determining, by the UE, location information of N target physical resource blocks PRBs, where the N target PRBs are frequency domain resources for a target physical uplink control channel PUCCH; and mapping, by the UE, sequence information of the target PUCCH to the N target PRBs based on the location information, where N is a positive integer greater than 1.

17 Claims, 4 Drawing Sheets

UE determines location information of N target physical resource blocks PRBs ⌇ 201

The UE maps sequence information of a target PUCCH to the N target PRBs based on the location information ⌇ 202

(58) Field of Classification Search
CPC ............. H04W 72/53; H04W 74/0808; H04W 72/0446; H04W 74/0833; H04L 5/0053; H04L 5/0094; H04L 27/26025; H04L 27/2602; H04L 5/0012; H04L 5/0051; H04L 5/0048; H04B 1/713
See application file for complete search history.

(56) References Cited

U.S. PATENT DOCUMENTS

| | | | | |
|---|---|---|---|---|
| 11,864,184 | B2 * | 1/2024 | Li | ........................ H04L 1/0031 |
| 12,256,383 | B2 * | 3/2025 | Lee | ...................... H04L 5/0053 |
| 2014/0362743 | A1 | 12/2014 | Park et al. | |
| 2018/0084573 | A1 * | 3/2018 | Jiang | ...................... H04L 5/001 |
| 2018/0184432 | A1 | 6/2018 | Ryoo et al. | |
| 2018/0294934 | A1 | 10/2018 | Kim et al. | |
| 2021/0014868 | A1 | 1/2021 | Tang | |
| 2021/0266946 | A1 | 8/2021 | Li et al. | |
| 2021/0337532 | A1 * | 10/2021 | Zhou | ..................... H04W 72/21 |
| 2022/0132545 | A1 * | 4/2022 | Lee | ...................... H04L 1/1896 |
| 2023/0046074 | A1 | 2/2023 | Zhang et al. | |

FOREIGN PATENT DOCUMENTS

| | | | |
|---|---|---|---|
| CN | 109802790 | A | 5/2019 |
| CN | 110034903 | A | 7/2019 |
| CN | 110149703 | A | 8/2019 |
| CN | 111093219 | A | 5/2020 |
| CN | 111130708 | A | 5/2020 |
| WO | 2019144010 | A1 | 7/2019 |
| WO | 2019191963 | A1 | 10/2019 |
| WO | 2020143713 | A1 | 7/2020 |
| WO | 2020146643 | A1 | 7/2020 |

OTHER PUBLICATIONS

Intel Corporation "Short PUCCH format for UCI up to 2 bits" 3GPP TSG RAN WG1 Meeting #90, Prague, Czech Republic, Aug. 2017, R1-1712576, 11 Pages.
First Office Action for Chinese Application No. 202011625353.2, dated Feb. 6, 2025, 23 Pages.
Extended European Search Report for Application No. 21914599.2, dated Apr. 24, 2024, 12 Pages.
First Office Action for Japanese Application No. 2023-537338, dated Aug. 20, 2024, 15 Pages.
Vivo "Discussion on short-PUCCH up to 2-bit" 3GPP TSG RAN WG1 Meeting #90, Prague, Czech Republic, Aug. 2017, R1-1712855, 4 Pages.
Qualcomm Incorporated. UL signals and channels for NR-U. 3GPP TSG RAN WG1 Meeting #99. R1-1912937. Online. Nevada. Nov. 2019. 24 pages.
First Korean Office Action for Korean Patent Application No. 10-2023-7024924 mailed Aug. 19, 2025. 9 pages.

* cited by examiner

RESOURCE MAPPING METHOD AND APPARATUS AND DEVICE

CROSS-REFERENCE TO RELATED APPLICATIONS

This application is a continuation of International Application No. PCT/CN2021/142875 filed on Dec. 30, 2021, which claims priority to Chinese Patent Application No. 202011625353.2, filed on Dec. 31, 2020, which are incorporated herein by reference in their entireties.

TECHNICAL FIELD

This application pertains to the field of communication technologies, and specifically relates to a resource mapping method and apparatus and a device.

BACKGROUND

In a case that a communication system is on 60 GHz band (typically 52.6 GHz to 71.2 GHz), the frequency domain resource used by user equipment UE to support a physical uplink control channel (PUCCH) is typically a physical resource block (PRB). In a case that the frequency domain resource is a PRB, due to the limitation of power spectral/spectrum density (PSD), a signal transmitted by the UE may have a relatively low power and a relatively low signal noise ratio (SNR), such that the signal transmitted by the UE has a relatively small coverage and a relatively poor coverage (for example, the UE transmits a signal with a small coverage).

SUMMARY

Embodiments of this application provide a resource mapping method and apparatus and a device.

According to a first aspect, a resource mapping method is provided. The method is applied to user equipment UE, and the method includes: determining, by the UE, location information of N target physical resource blocks PRBs, where the N target PRBs are frequency domain resources for a target physical uplink control channel PUCCH; and mapping, by the UE, sequence information of the target PUCCH to the N target PRBs based on the location information, where N is a positive integer greater than 1.

According to a second aspect, a resource mapping apparatus is provided. The apparatus includes a determining module and a mapping module. The determining module is configured to determine location information of N target physical resource blocks PRBs, where the N target PRBs are frequency domain resources for a target physical uplink control channel PUCCH. The mapping module is configured to map sequence information of the target PUCCH to the N target PRBs based on the location information, where N is a positive integer greater than 1.

According to a third aspect, a resource mapping method is provided. The method is applied to a network-side device, and the method includes: determining, by the network-side device, target information; transmitting, by the network-side device, the target information to UE; where the target information is used for determining location information of N target PRBs; the N target PRBs are frequency domain resources for the target PUCCH; the target information includes PRB information of the N target PRBs; the PRB information includes at least one of the following: target pattern information corresponding to the N target PRBs, an index set of indexes of the N target PRBs, and relative location relationship between M first PRBs and at least one second PRB; the N target PRBs include the M first PRBs and the at least one second PRB; and relative location information of at least one of the first PRBs on the frequency domain resources for the target PUCCH.

According to a fourth aspect, a resource mapping apparatus is provided. The apparatus includes a determining module and a transmitting module. The determining module is configured to determine target information. The transmitting module is configured to transmit the target information to UE. The target information is used for determining location information of N target PRBs; the N target PRBs are frequency domain resources for the target PUCCH; the target information includes PRB information of the N target PRBs; the PRB information includes at least one of the following: target pattern information corresponding to the N target PRBs, an index set of indexes of the N target PRBs, and relative location relationship between M first PRBs and at least one second PRB; the N target PRBs include the M first PRBs and the at least one second PRB; and relative location information of at least one of the first PRBs on the frequency domain resources for the target PUCCH.

According to a fifth aspect, a terminal is provided. The terminal includes a processor, a memory, and a program or instructions stored in the memory and capable of running on the processor. When the program or instructions are executed by the processor, the steps of the method according to the first aspect are implemented.

According to a sixth aspect, a network-side device is provided. The network-side device includes a processor, a memory, and a program or instructions stored in the memory and capable of running on the processor. When the program or instructions are executed by the processor, the steps of the method according to the first aspect are implemented.

According to a seventh aspect, a readable storage medium is provided. The readable storage medium stores a program or instructions, and when the program or instructions are executed by a processor, the steps of the method according to the first aspect or the steps of the method according to the third aspect are implemented.

According to an eighth aspect, a chip is provided. The chip includes a processor and a communication interface. The communication interface is coupled to the processor, and the processor is configured to run a program or instructions on a network-side device so as to implement the method according to the first aspect or implement the method according to the third aspect.

In the embodiments of the application, UE first determines frequency domain resources for a target physical uplink control channel PUCCH, to be specific, location information of N target physical resource blocks PRBs or location information of the PUCCH, where N is a positive integer greater than 1, and then maps sequence information of the target PUCCH to the N target PRBs based on the location information of the N target PRBs, where N is a positive integer greater than 1.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the data used in this way is interchangeable in appropriate circumstances such that the embodiments of this application can be implemented in other orders than the order illustrated or described herein. In addition, objects distinguished by "first" and "second" are generally of a same type, and the quantities of the objects are not limited. For example, there may be one or more first objects. In addition, in this specification and claims, "and/or" indicates at least one of the connected objects, and the character "/" generally indicates an "or" relationship between the contextually associated objects.

It is worth noting that the technologies described in the embodiments of this application are not limited to long term evolution (LTE)/LTE-Advanced (LTE-A) systems, but may also be used in other wireless communication systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (NR) system is described for illustration purposes, and NR terms are used in most of the following descriptions, although these technologies may also be applied to other applications than the NR system application, for example, the 6th generation (6G) communication system.

Figure 1:
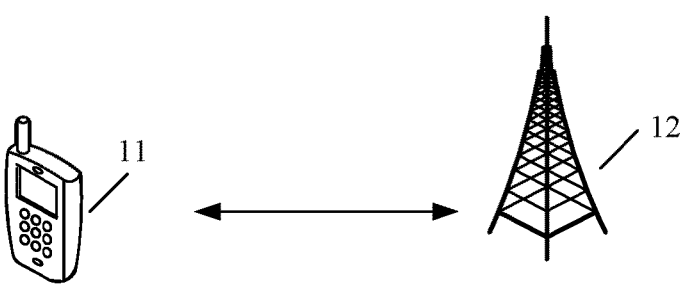
FIG. 1 is a possible schematic structural diagram of a communication system according to an embodiment of this application.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a wrist band, earphones, glasses, and the like. It should be noted that the terminal 11 is not limited to any particular type in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmission reception point (TRP), or other appropriate terms in the art. Provided that the same technical effects are achieved, the base station is not limited to any specific technical term. It should be noted that in the embodiments of this application, only the base station in the NR system is used as an example, although the specific type of the base station is not limited.

The nouns that appear in the embodiments of this application are explained below.

1. PUCCH

A PUCCH may be used for a terminal to transmit information, for example, scheduling request SR (Scheduling Request), HARQ feedback, and channel state information (CSI), associated with uplink scheduling to a base station.

2. PRB

In an NR communication system, a PRB is 12 consecutive REs in frequency domain.

3. Subcarrier Spacing (SCS)

A subcarrier spacing is the smallest granularity in frequency domain. For example, in an NR communication system, $15 \times 2^n$, where n is an integer greater than or equal to 0. A subcarrier width may be one of 15 kHz, 30 kHz, and 60 kHz, but is not limited to the three subcarrier widths listed herein.

4. PUCCH Format

A PUCCH in an NR communication system supports 5 different formats. Based on the number of symbols occupied in time domain, PUCCH formats can be classified into short formats and long formats. The short formats occupy 1 or 2 symbols, and the long formats occupy 4 to 14 symbols, as shown in Table 1 below.

TABLE 1

| PUCCH format | Time domain resource | Frequency domain resource | UCI bearer |
|---|---|---|---|
| PUCCH Format 0 | Short PUCCH, 1 or 2 symbols | 1 PRB | ≤2 bits |
| CCH Format 1 | Long PUCCH, 4 to 14 symbols | 1 PRB | ≤2 bits |
| UCCH Format 2 | Short PUCCH, 1 or 2 symbols | 1 to 16 PRBs | >2 bits |
| PUCCH Format 3 | Long PUCCH, 4 to 14 symbols | 1 to 16 PRBs $2^a \times 3^b \times 5^c$ | >2 bits |
| PUCCH Format 4 | Long PUCCH, 4 to 14 symbols | 1 PRB | >2 bits |

5. PUCCH Sequence Generation

The PUCCH format 0 sequence is a computer generated sequence (CGS) with a length of 12, with characteristics of low peak-to-average power ratio (PAPR) and single carrier.

In the case of format 0, a size of a cyclic shift of the PUCCH format 0 sequence is determined depending on an initial cyclic shift together with a hybrid automatic repeat request acknowledgment (HARQ-ACK) specific cyclic shift. UCI information is added through selection of a sequence, in other words, different information is represented through different cyclic shifts of the sequence. Sequences of different cyclic shifts are orthogonal, so multiple UEs can select their respective cyclic shifts and reuse a same resource block (RB).

The PUCCH format 1 sequence is a CGS sequence with a length of 12 and does not need to carry information through the cyclic shift of the sequence. The cyclic shift of the sequence is used for only multi-user code division multiplexing. The manner in which PUCCH format 1 uses a sequence to carry 1-bit or 2-bit information is as follows: modulation symbols of information to be carried are multiplied by the sequence to add the information on the sequence. In the case that 1-bit information is required to be added, binary phase shift keying (BPSK) modulation is used; and in the case that 2-bit information is required to be added, quadrature phase shift keying (QPSK) modulation is used, and then modulation symbols are multiplied by the sequence to form a modulation sequence with a length of 12.

The PUCCH format 3 sequence is a CGS sequence with a length of 12. In PUCCH format 1, because more uplink control information (UCI) needs to be added in PUCCH format 2, it is impossible to use different sequence cyclic shifts to carry information, and only a transmission mode of UCI plus demodulation reference signal (DMRS) can be used. A channel-coded bit sequence is mapped to resource elements (RE) after undergoing scrambling and modulation. No discrete Fourier transform (DFT) precoding is performed on UCI in PUCCH format 2, in other words, the CP-OFDM waveform is used, and a modulation mode is fixed in using QPSK instead of pi/2-BPSK.

The PUCCH format 3 sequence is a CGS sequence with a length of 12. PUCCH format 3 uses the DFT-s-OFDM waveform. In order to further reduce the PAPR, pi/2-BPSK is introduced. Whether pi/2-BPSK or QPSK is specifically used is indicated by high-level parameters. PUCCH format 3 also does not use sequence cyclic shifts to carry information, and the channel-coded bit sequence is mapped to REs after undergoing scrambling, modulation, and DFT precoding.

The PUCCH format 3 sequence is a CGS sequence with a length of 12, and PUCCH format 4 supports code division multiplexing, meaning that PUCCH format 4 supports multi-user multiplexing. UCI supports multi-user multiplexing through spread spectrum, so the modulated sequence is required to undergo spread spectrum processing to support code division multiplexing, meaning that the channel-coded bit sequence is mapped to resources after undergoing scrambling, modulation, block-wise spreading, and DFT precoding. However, DMRS implements multi-user multiplexing through sequence cyclic shifts, so there is a predefined relationship between an orthogonal sequence in UCI spread spectrum and cyclic shifts of DMRS.

6. PUCCH Sequence Mapping

PUCCH format 0 occupies 1 or 2 symbols in time domain, occupies all 12 subcarriers of 1 RB in frequency domain, and has no DMRS. Therefore, the generated sequence with a length of 12 is directly mapped to 12 REs of the PRB.

PUCCH format 1 occupies 4 to 14 symbols in time domain and 12 subcarriers in frequency domain, which is a long PUCCH format and for which intra-slot frequency hopping can be configured. The number of symbols in the first hop during frequency hopping is calculated by dividing the total number of symbols by 2 and rounded down, and the remaining symbols are in the second hop. For resource mapping, when UCI and DMRS are mapped to REs, the UCI and DMRS of PUCCH format 1 are spaced apart from each other, and symbols occupied are allocated as evenly as possible, to be specific, no matter whether frequency hopping is configured, DMRS only occupies OFDM symbols with even index in PUCCH (starting with a first symbol index of 0).

The DMRS generation formula of PUCCH format 2 is the same as the DMRS of PUSCH of CP-OFDM waveform, and the DMRS and UCI are frequency-division multiplexed, which is different from PUCCH format 1. PUCCH format 2 occupies any value in 1 to 16 RBs in frequency domain, and the DMRS density is 3, meaning that 3 REs in 1 RB are occupied by DMRS, and the remaining REs are UCI. PUCCH format 2 occupies 1 or 2 symbols in time domain and is a short PUCCH format.

PUCCH format 3 occupies 4 to 14 symbols in time domain, and in frequency domain, occupies subcarriers with the number of RBs in 1 to 16 RBs that is the product of powers of 2, 3, and 5 (for which such setting is based on DFT precoding calculation efficiency). PUCCH format 3 is a long PUCCH format, and DMRS and UCI are time-division multiplexed and each occupy all subcarriers in the RB, which is similar to PUCCH format 1.

PUCCH format 4 occupies all 12 subcarriers of 1 RB in frequency domain, and occupies 4 to 14 symbols in time domain, which is the same as format 3, and is a long PUCCH format. Similarly, DMRS and UCI are time-division multiplexed, and the DMRS has the same location configuration as format 3.

TABLE 2

| | | | Number of symbols (Number of symbols) | PRB offset $RB_{BWP}^{offset}$ (PRB offset of BWP in which PUCCH is located) | Set of initial CS indexes (Set of initial cyclic shift indexes) |
|---|---|---|---|---|---|
| Index (Index) | PUCCH format (PUCCH format) | First symbol (First symbol) | | | |
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

7. PUCCH Frequency Domain Resource Configuration

PUCCH resources include a common resource configuration and a dedicated resource configuration. The common resource configuration is a frequency domain resource configuration obtained according to the foregoing Table 2 and RRC signaling. The RRC signaling can specify a line in table 2, and then gets a start location of PRB according to detected downlink control information (DCI) control channel element (CCE), PUCCH resource indication signaling carried, a PRB offset, and a PRB size of BWP. Because there can only be PUCCH formats 0 and 1 in the common resource configuration, meaning that frequency domain resources all have a size of 1 PRB, after a start location of the PRB is specified, locations of the frequency domain resources can be obtained.

For the dedicated frequency domain resource configuration, a start PRB of the first hop (or when there is no hop) is determined using RRC, and a start PRB of the second hop is determined through a second hop PRB. Frequency domain resource locations can be determined in format 0, format 1, and format 4 with only one PRB.

Existing NR communication systems run on 60 GHz band. It can be learned from the foregoing that frequency domain resources for PUCCH format 0, PUCCH format 1, and PUCCH format 4 for carrying uplink control information are fixed to one PRB. However, in the case that the frequency domain resource is a single PRB, the maximum PSD on 60 GHz band is 23 dBm/MHz according to relevant protocol, which is far less than the maximum radio frequency output power, that is, 40 dBm. Therefore, under the limitation of PSD, power of a signal transmitted by UE is limited, leading to a relatively small coverage of the signal transmitted by the UE and a relatively poor coverage (for example, the UE transmits a signal with a small coverage).

In the resource mapping method provided in the embodiments of this application, UE uses N target PRBs as frequency domain resources for a PUCCH (where N is a positive integer greater than 1), and on this basis, the UE determines location information of the N target PRBs, and map sequence information of the target PUCCH to the N target PRBs based on the location information. In this way, in a case that a communication system is on 60 GHz band, since the frequency domain resources used by the UE to support the PUCCH are multiple PRBs, the power of a signal transmitted by the UE is increased, thus the SNR is increased, and finally a coverage of the signal transmitted by the UE can be increased.

The following describes in detail the resource mapping method provided in the embodiments of this application by using specific embodiments and application scenarios thereof with reference to the accompanying drawings.

Figure 2:
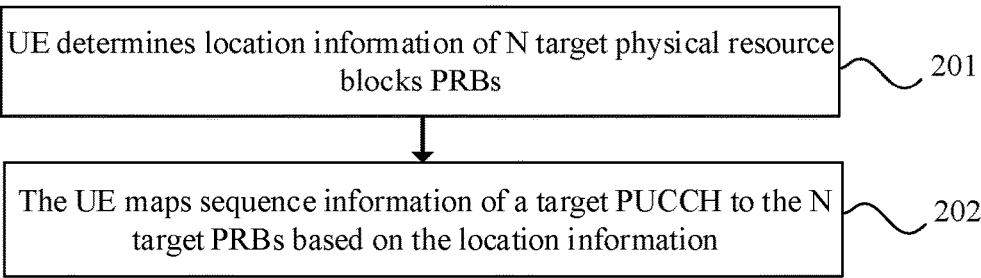
FIG. 2 is a first schematic flowchart of a resource mapping method according to an embodiment of this application.

FIG. 2 is a schematic flowchart of a resource mapping method according to an embodiment of this application. As shown in FIG. 2, the resource mapping method is applied to UE, and the resource mapping method may include steps 201 and 202.

Step 201: The UE determines location information of N target physical resource blocks PRB s.

In this embodiment of this application, the N target PRBs are frequency domain resources for a target physical uplink control channel PUCCH, and N is a positive integer greater than 1.

In this embodiment of this application, the number corresponding to the N target PRBs is greater than 1.

It can be understood from the foregoing description that in the case of PUCCH format 0, PUCCH format 1, and PUCCH format 4, the number of PRBs on the frequency domain resources is 1, and in the three PUCCH formats, the UE uses a plurality of PRBs to increase the power of a signal transmitted by the UE, thereby increasing a coverage of the PUCCH.

In this embodiment of this application, the location information may be absolute location information of the frequency domain resources on which the N target PRBs are located.

Step 202: The UE maps sequence information of the target PUCCH to the N target PRBs based on the location information.

It should be noted that this embodiment of this application is not limited to be applicable to 60 GHz band, and may also be applicable to other frequency ranges.

In the resource mapping method according to this embodiment of the application, UE first determines frequency domain resources for a target physical uplink control channel PUCCH, to be specific, location information of N target physical resource blocks PRBs or location information of the PUCCH, where N is a positive integer greater than 1, and then maps sequence information of the target PUCCH to the N target PRBs based on the location information of the N target PRBs, where N is a positive integer greater than 1. In this way, since the frequency domain resources used by the UE to support the PUCCH are multiple PRBs, the power of a signal transmitted by the UE is increased, thus the SNR is increased, and finally a coverage of the signal transmitted by the UE can be increased.

Optionally, in this embodiment of this application, in the foregoing step 201, the resource mapping method according to this embodiment of this application may include the following steps 203 and 204.

Step 203: The UE determines first index information of M first PRBs.

For example, the first index information is used to indicate location information of the M first PRBs.

For example, the M first PRBs are M PRBs in the N target PRBs, and M is a positive integer less than or equal to N.

Step 204: The UE determines the location information of the N target PRBs based on the first index information.

For example, the first index information may further include indexes of the M first PRB s.

Optionally, in this embodiment of this application, the first index information is predefined, specified by a protocol, or preconfigured.

For example, a relationship between M and N includes the following two cases.

Case 1: When M is equal to N, the first index information may include index information of the N target PRBs. The index information of the N target PRBs includes absolute location information of each target PRB in the frequency domain resources.

Case 2: When M is less than N, the first index information may include index information of the M first PRBs. The index information of the M first PRBs includes relative location information of each first PRB in the target PUCCH and absolute location information of each first PRB in the frequency domain resources, and further, indexes in the index information of the M first PRBs may be used as indexes of reference PRBs (to be specific, the M first PRBs are the reference PRBs). Based on the indexes of the reference PRBs, index information of the remaining (N–M) target PRBs may be obtained using number information, and/or relative location information, and/or relative location information of at least one of M reference PRBs in PUCCH frequency domain resources. The specific implementation is described in subsequent content.

It should be noted that the technical solutions of the foregoing step 203 and step 204 can be applied when the frequency domain resources for the target PUCCH are dedicated PUCCH resources, and can also be applied when the frequency domain resources for the target PUCCH are common PUCCH resources.

In this way, the UE can determine the location information of the N target PRBs using the first index information of the M first PRBs that is used for indicating the location information of the first PRBs, where M is a positive integer less than or equal to N. In this way, regardless of whether the UE obtains the index information of all of the PRBs or obtains the index information of only some of the target PRBs, the UE can finally determine the location information of all the target PRBs, such that it is convenient for the UE to determine the location information of the N target PRBs in different scenarios.

Optionally, in this embodiment of this application, before the foregoing step 201, the resource mapping method according to this embodiment of this application may include the following step 205.

Step 205: Receive target information from a network-side device.

For example, the target information is used for determining the location information of the N target PRBs; the target information includes SCS information corresponding to X SCSs; the SCS information corresponding to the X SCSs includes index information corresponding to each SCS; and the first index information is index information corresponding to a target SCS in which the UE is located in the X SCSs.

For example, for the first index information, reference may be made to the foregoing description. Details are not repeated herein.

For example, for the SCS information, reference may be made to the foregoing description. Details are not repeated herein.

For example, the target SCS is one of the X SCSs. For example, when the X SCSs are 3 SCSs, namely 15 kHz, 30 kHz, and 60 kHz, if the SCS in which the UE side is currently located is 15 kHz, the target SCS is 15 kHz.

In this way, in a case that the UE is in different SCSs, because of receiving the index information of the N target PRBs corresponding to the different SCSs from the network side, the UE can obtain the index information of the N target PRBs for the SCSs of the current PUCCH, so as to accurately and quickly determine the index information of the N target PRBs and then map the sequence information of the target PUCCH to the N target PRBs.

Optionally, in this embodiment of this application, the first index information includes a first index set.

For example, the first index set includes indexes of the M first PRBs.

In an example, when M=N, the first index set may include an index set of the index information of the N target PRBs. To be specific, in the case of M=N, the UE can directly obtain the index information including the N target PRBs through the first index set.

In another example, when M<N, the first index set may include an index set of the index information of the M first PRBs. To be specific, in the case of M<N, the UE can obtain the index information including the M first PRBs through the first index set. Further, the indexes in the index information of the M first PRBs may be used as indexes of reference PRBs (meaning that the M first PRBs are reference PRBs). Based on the indexes of the reference PRBs, index information of the remaining (N−M) target PRBs may be obtained through number information, and/or relative location information, and/or relative location information of at least one of M reference PRBs in PUCCH.

It should be noted that the technical solutions corresponding to the first index set can be applied when the frequency domain resources for the target PUCCH are dedicated PUCCH resources, and can also be applied when the frequency domain resources for the target PUCCH are common PUCCH resources.

In this way, the UE can directly obtain the index information of the M first PRBs through the first index set, and based on a value of M, can directly obtain the index information of the N target PRBs, or obtain the index information of the M reference PRBs, and then obtain the index information of the remaining PRBs. In this way, regardless of whether obtaining index information of all PRBs or obtains index information of only some target PRBs, the UE can finally determine the location information of all the target PRBs, such that the UE can accurately determine the location information of the N target PRBs in two scenarios of obtaining the index information of some or all of the PRBs.

Optionally, in the case that M is less than N, after the foregoing step 201, the resource mapping method according to this embodiment of this application may include the following step 206.

Step 206: The UE determines location information of at least one second PRB based on the first index information.

For example, the at least one second PRB is a PRB in the N target PRBs other than the M PRBs.

Optionally, in the case that the frequency domain resources for the target PUCCH are dedicated PUCCH resources, in the foregoing step 206, the resource mapping method according to this embodiment of this application may include the following step 206*a*.

Step 206*a*: The UE determines second index information of the at least one second PRB based on the first index information and first information.

For example, the first information includes any one of the following:

in a case that indexes corresponding to the N target PRBs are consecutive indexes, the number of the target PRBs and relative location information of at least one of the first PRBs on the target PUCCH;

in a case that the UE is unable to know whether indexes corresponding to the N target PRBs are consecutive indexes or not, relative location information between each second PRB and at least one of the first PRBs; and in a case that the UE is unable to know whether indexes corresponding to the N target PRBs are consecutive indexes or not, target pattern information corresponding to the N target PRBs and relative location information of at least one of the first PRBs on the target PUCCH.

The second index information is used to indicate location information of each second PRB.

For example, the target pattern information is one of multiple pieces of pattern information. The pattern information may be used for determining the number of PRBs on the PUCCH and relative locations between different PRBs. For example, when the target pattern information is {11111100000}, the pattern information indicates that the number of PRBs on the PUCCH is 6, and when the first index information of the PRBs is K1 and the relative locations of the first PRBs on the PUCCH are the smallest indexes, the relative locations of the PRBs are {K1, K1+1, K1+2, K1+3, K1+4, K1+5} (1 in the target pattern information means that there are PRB resources, and 0 means that there is no PRB resource).

Optionally, in this embodiment of this application, the target pattern information is: one piece of preset pattern information in at least one piece of preset pattern information configured by RRC, specified by a protocol, or predefined.

Optionally, in this embodiment of this application, the number of the target PRBs is configured by RRC, specified by a protocol, or predefined.

Optionally, in this embodiment of this application, the relative location information between each second PRB and at least one of the first PRBs is configured by RRC, specified by a protocol, or predefined.

Optionally, in this embodiment of this application, the relative location information of the at least one of the first PRBs on the target PUCCH is configured by RRC, specified by a protocol, or predefined.

It can be understood that:

1. The RRC configuration may be configured by the network-side device, meaning that the network-side device transmits an RRC information instruction, and notifies, by using this instruction, the UE of target pattern information of the second PRB, the number of target PRBs, the relative location information between each second PRB and at least one of the first PRBs, or the relative location information of the at least one of the first PRBs on the target PUCCH.

2. The foregoing content specified by a protocol may be: in the case that the PUCCH contains multiple PRBs and the UE has learned some of the PRBs, target pattern information of the second PRB, the number of target PRBs, the relative location information between each second PRB and at least one of the first PRBs, or the relative location information of the at least one of the first PRBs on the target PUCCH that are specified by a protocol (for example, a predetermined protocol for NR communication systems) in the related art.

3. The foregoing content predefined may be: in a case that the PUCCH contains multiple PRBs and the UE has learned some of the PRBs, and in a case that preset content in the UE meets a relevant condition, target pattern information of the second PRB, the number of target PRBs, the relative location information between each second PRB and at least one of the first PRBs, or the relative location information of the at least one of the first PRBs on the target PUCCH.

For example, in the case that the indexes corresponding to the N target PRBs are consecutive indexes, the UE can know that the N target PRBs are consecutive PRBs. On this basis, when the UE has obtained the index information of the M first PRBs, the number of target PRBs, and the relative location information (that is, the first information mentioned above) of the at least one of the first PRBs on the frequency domain resources for the target PUCCH, the UE can know the location information of the second PRB, and thus obtain location information of absolute locations of the N target PRBs on the frequency domain resources.

Example 1: In a case that the UE knows that the N target PRBs are consecutive PRBs and has obtained the index information of one PRB (the first PRB) of the N target PRBs, when the UE has obtained that N=5 and the relative location information of the first PRBs on the target PUCCH, the UE can know index information of the other four PRBs (that are, the second PRBs) except the first PRB, and finally obtain location information of absolute locations of the five PRBs on the frequency domain resources.

It should be noted that the consecutive information is obtained by the UE according to a predetermined protocol for NR communication systems.

For example, in the case that the UE is unable to know whether indexes corresponding to the N target PRBs are consecutive indexes or not, on the basis that the UE has obtained the index information of the M first PRBs:

when the UE has obtained the relative location information between each second PRB and at least one of the first PRBs, the UE can know the location information of the second PRB, and thus obtain location information of absolute locations of the N target PRBs on the frequency domain resources.

Example 2: In a case that the UE has obtained the index information of one PRB (the first PRB) of the N target PRBs, when the UE has obtained relative location information of four second PRBs and the first PRB, the UE can know index information of the other four PRBs (that are, the second PRBs) except the first PRB, and finally obtain location information of absolute locations of the five PRBs on the frequency domain resources.

In the case of having obtained the target pattern information corresponding to the N target PRBs and the relative location information of the at least one of the first PRBs on the frequency domain resources for the target PUCCH, the UE can know the location information of the second PRB, and then obtain location information of absolute locations of the N target PRBs on the frequency domain resources.

Example 3: In a case that the UE has obtained the index information of one PRB (the first PRB) of the N target PRBs, and in a case that UE has obtained the target pattern information and relative location information of the first PRB on the frequency domain resources for the PUCCH, where the target pattern information shows that there are five PRBs on the PUCCH, the UE can know index information of the other four PRBs (that are, the second PRBs) except the first PRB, and finally obtain location information of absolute locations of the five PRBs on the frequency domain resources.

Example 1: The frequency domain resources for the target PUCCH are dedicated PUCCH resources. In a case that the first information includes the target pattern information corresponding to the N target PRBs and the relative location information of the at least one of the first PRBs on the frequency domain resources for the target PUCCH, the UE receives index information (that is, the first index information) of the first PRB that is configured by the network-side device using RRC, where formats of the index information for the N target PRBs are all the index of the first PRB, namely, K1; and the UE determines that the first PRB is the smallest PRB on the frequency domain resources for the PUCCH (that is, the relative location information of the at least one first PRB on the frequency domain resources for the target PUCCH).

On this basis, a communication system can correspond to four sets of pattern information, namely {111111111111}, {11111100000}, {000000111111}, and {11001100110}, where 1 means that there are PRB resources at this location, and 0 means that there is no PRB resource, and the UE determines that the target pattern information is {111111000000} based on received RRC indication from the network-side device, and further combines the target pattern information with the index information of the first PRB and the information that the first PRB is the smallest PRB on the frequency domain resources for the PUCCH, to determine the location information of the N target PRBs as {K1, K1+1, K1+2, K1+3, K1+4, K1+5}.

In this way, in the case that the frequency domain resources for the target PUCCH are dedicated PUCCH resources and the UE obtains the index information of the first PRBs (that are, some PRBs), the UE can obtain, in the preceding different ways, location information of absolute locations of all PRBs on the frequency domain resources.

Optionally, in this embodiment of this application, before the foregoing step 201, the resource mapping method according to this embodiment of this application may include the following step 207.

Step 207: The UE receives target information from the network-side device.

For example, the target information is used for determining the location information of the N target PRBs;

the target information includes SCS information corresponding to X SCSs; and the SCS information corresponding to the X SCSs includes: first location information corresponding to each SCS, and pattern information corresponding to each SCS, where the first location information corresponding to one of the SCSs is relative location information between the first PRB corresponding to the one SCS and the at least one second PRB.

For example, for the SCS information, reference may be made to the foregoing description. Details are not repeated herein.

For example, the first location information corresponding to each SCS is the location information of the N target PRBs when the UE is in different SCSs; and the pattern information corresponding to each SCS is the pattern information corresponding to the N target PRBs when the UE is in different SCSs.

In an example, the first location information may include a location information set of relative location information between the second PRB and the first PRBs in the case of different SCSs. For example, the first location information may include: the relative location information between the second PRB and the first PRBs when the SCS in which the UE is located is 15 KHz, and the relative location information between the second PRB and the first PRBs when the SCS in which the UE is located is 30 KHz.

In an example, the pattern information corresponding to each SCS is a pattern information set of the pattern information corresponding to the N target PRBs when the UE is in different SCSs. For example, the first location information may include the pattern information of the N target PRBs when the SCS in which the UE is located is 15 KHz, and the pattern information of the N target PRBs when the SCS in which the UE is located is 30 KHz.

In this way, in a case that the UE is in different SCSs, because the UE receives the location information or pattern information of the N target PRBs corresponding to the different SCSs from the network side, the UE can obtain the location information or pattern information of the N target PRBs suitable for the SCS in which the UE is currently located, so as to accurately and quickly determine the location information of the N target PRBs and then map the sequence information of the target PUCCH to the N target PRBs.

Optionally, in the case that the frequency domain resources for the target PUCCH are common frequency domain resources, in the foregoing step 201, the resource mapping method according to this embodiment of this application may include the following step 208.

Step 208: The UE calculates the first index information of the M first PRBs based on second information.

For example, the second information includes at least one of the following:

the number of CCEs in a CORESET to which a PDCCH corresponding to the target PUCCH belongs;

index information of a first CCE of the PDCCH;

a value of a PUCCH resource indication field in a DCI format corresponding to the PDCCH;

frequency hopping indication information;

a total number of cyclic shifts in an initial cyclic shift index set of the target PUCCH;

the number of PRBs of a BWP on which the target PUCCH is located; and a PRB offset of a BWP on which the target PUCCH is located; where the resource indication field is used to indicate a frequency domain resource location of the target PUCCH; and the frequency hopping indication information is used to indicate whether the target PUCCH supports frequency hopping or not.

For example, the frequency hopping indication information may be configured by RRC, specified by a protocol, or predefined.

For example, the number of CCEs in the CORESET to which the PDCCH corresponding to the target PUCCH belongs is $N_{CCE}$, index information of a first CCE for the PDCCH is $n_{CCE,0}$ and a value of a PUCCH resource indication field in a DCI format corresponding to the PDCCH is $\Delta_{PRI}$.

In an example, the UE may obtain $\gamma_{PUCCH}$ according to the foregoing $N_{CCE}$, $n_{CCE,0}$ and $\Delta_{PRI}$, specifically as the following formula (I):

$$r_{PUCCH} = \frac{2 \cdot n_{CCE,0}}{N_{CCE}} + 2 \cdot \Delta_{PRI} \tag{I}$$

In a case that the frequency hopping indication information indicates that the target PUCCH supports frequency hopping, if $\lfloor r_{PUCCH}/8 \rfloor = 0$, an index of the index information of the first PRB can be obtained according to the following formula (II) and formula (III):

the first hop is $$RB_{BWP}^{offset} + \left[ r_{PUCCH}/N_C S \right] \tag{II}$$

the second hop is $$N_{BWP}^{size} - 1 - RB_{BWP}^{offset} - r_{PUCCH}/N_{CS} \tag{III}$$

For example, the foregoing $N_{CS}$ is the total number of cyclic shifts of an initial cyclic shift set, the foregoing $$N_{BWP}^{size}$$

is the number of PRBs of a BWP on which the PUCCH is located, and the foregoing $$RB_{BWP}^{offset}$$

is the PRB offset of a BWP on which the PUCCH is located. The UE can specify an index in Table 2 according to PUCCH-ResourceCommon in RRC signaling transmitted by the network-side device, and then determine a value of $$RB_{BWP}^{offset}.$$

If $[r_{PUCCH}/8]=1$, an index of the index information of the first PRB can be obtained according to the following formula (IV) and formula (V):
the first hop is $$N_{BWP}^{size} - 1 - RB_{BWP}^{offset} - \lfloor (r_{PUCCH} - 8)/N_{CS} \rfloor \quad \text{(IV)}$$

the second hop is $$RB_{BWP}^{offset} + \lfloor (r_{PUCCH} - 8)/N_{CS} \rfloor \quad \text{(V)}$$

For example, for $N_{CS}$, $$N_{BWP}^{size}$$

and $$RB_{BWP}^{offset}$$

in the foregoing formula (IV) and formula (V), reference may be made to the foregoing descriptions. Details are not repeated herein.

In a case that the frequency hopping indication information indicates that the target PUCCH does not support frequency hopping, an index of the index information of the first PRB is m, and m can be obtained according to the following formula (VI):

$$m = RB_{BWP}^{offset} + \lfloor (r_{PUCCH} - 8)/N_{CS} \rfloor \quad \text{(VI)}$$

For example, for $N_{CS}$, $$N_{BWP}^{size}$$

and $$RB_{BWP}^{offset}$$

in the foregoing formula (VI), reference may be made to the foregoing descriptions. Details are not repeated herein.

Optionally, in this embodiment of this application, after the first index information of the M first PRBs is obtained in the foregoing step 208, index information of other PRBs in the N target PRBs, that is, the index information of the second PRB, can be obtained through the first index set or in the foregoing step 206.

Example 2: It is assumed that the UE receives RRC instruction information transmitted by the network-side device, where the RRC instruction information indicates that the target PUCCH corresponds to Index 0 in Table 2, and the frequency domain resources for the target PUCCH are common PUCCH resources. The first PRB is obtained in the following manner: obtaining $\gamma_{PUCCH}$, specifically $$r_{PUCCH} = \frac{2 \cdot n_{CCE,0}}{N_{CCE}} + 2 \cdot \Delta_{PRI},$$

first according to formula (I), and then in a case that the PUCCH supporting frequency hopping is obtained through the RRC instruction information of the network-side device, obtaining the index information of the first PRB based on calculation results of the foregoing formulas (II) to (V), and obtaining the first PRB being the smallest PRB in the frequency domain resources for the PUCCH through the RRC command information.

On this basis, a communication system can correspond to four sets of pattern information, namely {111111111111}, {11111100000}, {000000111111}, and {11001100110}, where 1 means that there are PRB resources, and 0 means that there is no PRB resource, and the UE determines that the target pattern information is {111111000000} based on received RRC indication from the network-side device, and further combines the target pattern information with the index information of the first PRB and the information that the first PRB is the smallest PRB on the frequency domain resources for the PUCCH, to determine the location information of the N target PRBs as {K1, K1+1, K1+2, K1+3, K1+4, K1+5}.

In this way, in the case that the frequency domain resources for the target PUCCH are common PUCCH resources and the UE obtains the index information of the first PRBs (that are, some PRBs), the UE can obtain, in the preceding different ways, location information of absolute locations of all PRBs on the frequency domain resources.

Optionally, in this embodiment of this application, in a case that the number of PRB offsets of a BWP on which the target PUCCH is located is equal to N, the first index information includes the first index set; and in a case that the number of PRB offsets of a BWP on which the target PUCCH is located is less than N, the first index information is used to indicate the location information of the M first PRBs.

For example, the UE obtains the location information of the respective first PRBs according to the foregoing step 208 by obtaining the number of PRB offsets of the BWP on which the PUCCH is located, and in the case that the number of PRB offsets of the BWP on which the PUCCH is located is P, the UE may obtain the index information of the P first PRBs.

In an example, if the number of PRB offsets of the BWP on which the PUCCH is located is P=N, the index information of the N target PRBs can be obtained directly.

In another example, if the number of PRB offsets of the BWP on which the PUCCH is located is P=M (where M is a positive integer less than N and greater than 1), the index information of the M first PRBs can be obtained directly, and then index information of other target PRBs in the N target PRBs, that is, the index information of the second PRB, is obtained through the first index set or in the foregoing step 206.

Optionally, in this embodiment of this application, in the foregoing step 202, the resource mapping method according to this embodiment of this application may include the following step 209.

Step 209: The UE maps to the N target PRBs in a preset manner based on a sequence length of the sequence information of the target PUCCH and the location information.

Optionally, in this embodiment of this application, the sequence length of the sequence information of the target PUCCH is configured by RRC, fixed, or predefined.

Optionally, in this embodiment of this application, in a case that the sequence length of the sequence information of the target PUCCH is equal to the number of REs of the N target PRBs, the preset manner includes: based on the sequence length of the sequence information, mapping the sequence information on the REs of the N target PRBs in a one-to-one manner; and in a case that the sequence length of the sequence information of the target PUCCH is equal to the number of REs of each target PRB, the preset manner includes any one of the following: performing mapping repetition on the N target PRBs, performing cyclic shift on the N target PRBs, and performing phase rotation between some PRBs of the N target PRBs; where one of the some PRBs includes some REs of the target PRB.

It should be noted that the number of REs of one PRB is usually 12.

For example, in a case that the sequence length of the sequence information of the target PUCCH is equal to the number of REs of the N target PRB:

in an example, in a case that the sequence length of the sequence information of the target PUCCH is equal to the number of REs of the N target PRBs, the preset manner of mapping the sequence information on the REs of the N target PRBs in a one-to-one manner based on the sequence length of the sequence information may be that: the sequence length of the target PUCCH is the same as the total number of REs of the N target PRBs.

Example 4: In a case that the sequence length of the sequence information of the target PUCCH is 12×N and the number of target PRBs is N (that is, the number of REs is 12×N), the sequence information of the target PUCCH can be mapped to the PRBs in a one-to-one manner.

For example, in a case that the sequence length of the sequence information of the target PUCCH is equal to the number of REs of each target PRB:

in an example, the preset manner is performing mapping repetition on the N target PRBs, that is, mapping the sequence information of the target PUCCH once on each target PRB.

Example 2: In a case that the sequence length of the sequence information of the target PUCCH is 12 and the number of target PRBs is 3, assuming that the target PRBs are PRB1, PRB2, and PRB3, the UE can first map the 12 pieces of sequence information of the target PUCCH on PRB1, then map the 12 pieces of sequence information of the target PUCCH on PRB2, and then map the 12 pieces of sequence information of the target PUCCH on PRB3.

In an example, the preset manner is performing cyclic shift on the N target PRBs.

It should be noted that the indexes of the cyclic shift may be related to the indexes of the N target PRBs.

In an example, the preset manner is performing phase rotation between some PRBs of the N target PRBs; where one of the some PRBs includes some REs of the target PRB.

It should be noted that the foregoing step 209 may be applicable to the case that the target PUCCH is in format 0 and the target PUCCH is in format 1.

Example 3: With reference to the foregoing example 1, after determining the location information of the N target PRBs, the UE determines cyclic shift alpha of the N target PRBs. A cyclic shift of the first PRB is ahpha1, and a cyclic shift of the second PRB is ahpha2 related to ahpha1 and the index of the second PRB. If the sequence length of the sequence information of the PRB is 12, sequences obtained according to the respective cyclic shifts are mapped to the respective PRBs.

Example 4: With reference to the foregoing example 2, after the location information of the N target PRBs is determined, if the sequence length of the target PUCCH is 12, the sequence information of the PUCCH is mapped to each PRB according to its respective cyclic shift.

In this way, when the PUCCH is in format 0 or format 1, different mapping methods can be selected for mapping based on the sequence length of the sequence information of the target PUCCH, thereby enriching the way for the UE to map the sequence information of the PUCCH to the PRBs.

Optionally, in this embodiment of this application, in the case that the target PUCCH is in format 0, before the foregoing step 209, the resource mapping method according to this embodiment of this application may include the following step 210.

Step 210: The UE adds a target demodulation reference signal DMRS, and multiplexes the target DMRS and the target PUCCH in frequency domain.

For example, in a case that the sequence length of the sequence information of the target PUCCH is equal to the number of REs of the N target PRBs that is obtained after exclusion of the target DMRS, the preset manner includes: mapping the sequence information to REs of the N target PRBs in a one-to-one manner based on the sequence length of the sequence information.

For example, in a case that the sequence length of the sequence information of the target PUCCH is equal to the number of REs of each target PRB that is obtained after exclusion of the target DMRS, the preset manner includes any one of the following: performing mapping repetition on the N target PRBs, performing cyclic shift on the N target PRBs, and performing phase rotation between some PRBs of the N target PRBs; where one of the some PRBs includes some REs of the target PRB.

For example, after the UE adds the target DMRS, because the DMRS also needs to be synchronized with the PUCCH to occupy PRBs for information transmission, the sequence length of the sequence information of the target PUCCH mapped on each target PRB may be redetermined. For example, when the sequence length of the sequence information of the target PUCCH is 12, before adding the target DMRS, the UE determines that the length of sequence information of the target PUCCH on each target PRB is 12; and after adding the target DMRS, the UE can redetermine that the length of the sequence information of the target PUCCH on each target PRB is 6.

For example, after the UE adds the target DMRS, the redetermined sequence length of the sequence information of the target PUCCH mapped on each target PRB may be configured by RRC, fixed, or predefined.

Example 5: It is assumed that the number of target PRBs is 2, namely PRB1 and PRB2, each PRB includes 12 REs, and the sequence length of the sequence information of the target PUCCH is 12. Before adding the target DMRS, the UE can map all of the sequence information of the target PUCCH on each RE of PRB1, and repeatedly map all of the sequence information of the target PUCCH on each RE of PRB2.

After the UE adds the target DMRS, if the information length of the DMRS is 6, the UE can divide the sequence information of the target PUCCH into two parts, with a sequence length of each part of the sequence information of 6. In this case, the mapping method is: mapping information (with a length of 6) about the DMRS and the part of the sequence information (with a length of 6) of the PUCCH on each RE of PRB1, and then mapping the remaining sequence information (with a length of 6) of the PUCCH and the information (with a length of 6) of the DMRS on each RE of PRB2.

In this way, the UE can enhance the band utilization efficiency without affecting the transmission of the sequence information of the PUCCH by adding the target DMRS.

Optionally, in this embodiment of this application, in the case that the target PUCCH is in format 0, before the foregoing step 209, the resource mapping method according to this embodiment of this application may include the following step 211.

Step 211: The UE adds a target DMRS, and multiplexes the target DMRS and the target PUCCH in time domain.

For example, after the UE adds a target DMRS, the DMRS needs to be synchronized with the PUCCH to occupy PRBs successively in time for information transmission. For example, the sequence length of the sequence information of the target PUCCH is 12, after adding the target DMRS, the UE can first transmit the sequence information of the PUCCH by using the target PRBs in the preset manner, and then transmit the target DMRS in the preset manner. For the preset manner, reference may be made to the foregoing descriptions. Details are not repeated herein.

Optionally, in this embodiment of this application, before the foregoing step 201, the resource mapping method according to this embodiment of this application may include the following step 212.

Step 212: The UE receives target information from a network-side device.

For example, the target information is used for determining the preset manner in a case that the sequence length of the sequence information of the target PUCCH is equal to the number of REs of each target PRB;

the target information includes SCS information corresponding to X SCSs; and the SCS information corresponding to the X SCSs includes a preset manner corresponding to each SCS; and the preset manner is a preset manner corresponding to a target SCS in which the UE is located in the X SCSs.

For example, for the SCS information and the preset manner, reference may be made to the foregoing descriptions. Details are not repeated herein.

For example, when the UE is in different SCSs, the mapping manners adopted by the UE to map the PUCCH to each PRB are not necessarily the same, and the preset manner may include any of the following: performing mapping repetition on the N target PRBs, performing cyclic shift on the N target PRBs, and performing phase rotation between some PRBs of the N target PRBs; where one of the some PRBs includes some REs of the target PRB.

In this way, in the case that the UE is in different SCSs, because the UE receives the preset mapping manner of mapping the sequence information of the PUCCH to each PRB from the network side, the UE can obtain the preset mapping manner that conforms to a current SCS in which the UE is located, so as to accurately and quickly determine a final mapping manner and then map the sequence information of the target PUCCH to the N target PRBs.

Figure 3:
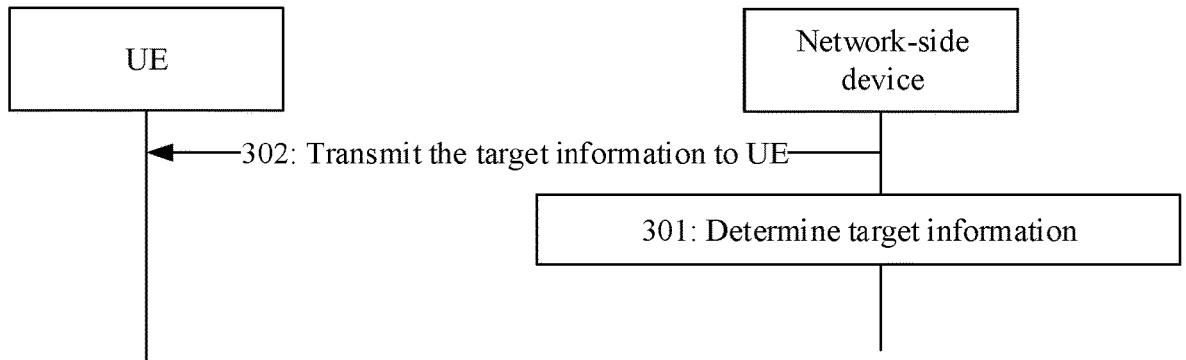
FIG. 3 is a second schematic flowchart of a resource mapping method according to an embodiment of this application.

FIG. 3 is a schematic flowchart of a resource mapping method according to an embodiment of the present invention. As shown in FIG. 3, the resource mapping method is applied to a network-side device, and the resource mapping method may include steps 301 and 302.

Step 301: A network-side device determines target information.

Step 302: The network-side device transmits the target information to UE.

In this embodiment of this application, the target information is used for determining location information of N target PRBs; where the N target PRBs are frequency domain resources for a target PUCCH;

the target information includes PRB information of the N target PRBs; and the PRB information includes at least one of the following:

target pattern information corresponding to the N target PRBs;

an index set of indexes of the N target PRBs;

a relative location relationship between M first PRBs and at least one second PRB;

the N target PRBs include the M first PRBs and the at least one second PRB; and relative location information of at least one of the first PRBs on the frequency domain resources for the target PUCCH.

In the resource mapping method according to this embodiment of this application, the network-side device determines the target information, and then transmits the target information to the UE, such that the UE can accurately determine the location information of the N target PRBs after receiving the target information.

Optionally, in this embodiment of this application, the target information includes SCS information corresponding to X SCSs; and each piece of SCS information includes PRB information of the N target PRB.

For example, the SCS information corresponding to X SCSs includes any one of the following:

index information corresponding to each SCS;

first location information corresponding to each SCS;

pattern information corresponding to each SCS; and preset manner corresponding to each SCS; where the first location information corresponding to one of the SCSs is relative location information between the first PRB corresponding to the one SCS and the at least one second PRB.

For example, for the index information, first location information, pattern information, and preset manner, reference may be made to the foregoing descriptions. Details are not repeated herein.

Optionally, in this embodiment of this application, the index set is an index set of SCSs corresponding to the target PUCCH, and the index set is a common index set for all UEs or a cell-level index set.

Optionally, in this embodiment of this application, in the transmitting the target information to UE in the foregoing step 302, the resource mapping method according to this embodiment of this application may include the following step 303.

Step 303: The network-side device transmits the index set of the N target PRBs to the UE in a broadcast manner.

For example, for the index set, reference may be made to the foregoing description. Details are not repeated herein.

In this way, the network-side device can directly transmit the index set to the UE via broadcasting, such that the UE can determine the location information of the N target PRBs after receiving the index set, and then map sequence information of the PUCCH to the N target PRBs.

Optionally, in this embodiment of this application, the resource mapping method according to this embodiment of this application may further include the following step 304.

Step 304: The network-side device configures a sequence length of the sequence information of the target PUCCH for the UE.

For example, the sequence length is used for determining the location information of the N target PRBs.

Optionally, in this embodiment of this application, in the transmitting the target information to UE in the foregoing step 302, the resource mapping method according to this embodiment of this application may further include the following step 305.

Step 305: The network-side device configures the target information for the UE using RRC.

In this way, the network-side device can directly configure the target information for the UE using RRC, such that the UE can determine the location information of the N target PRBs.

It should be noted that the resource mapping method according to this embodiment of this application may be executed by a resource mapping apparatus or a control module for executing the resource mapping method in the resource mapping apparatus. In this embodiment of this application, the resource mapping method being executed by the resource mapping apparatus is used as an example to describe the resource mapping apparatus according to the embodiments of this application.

Figure 4:
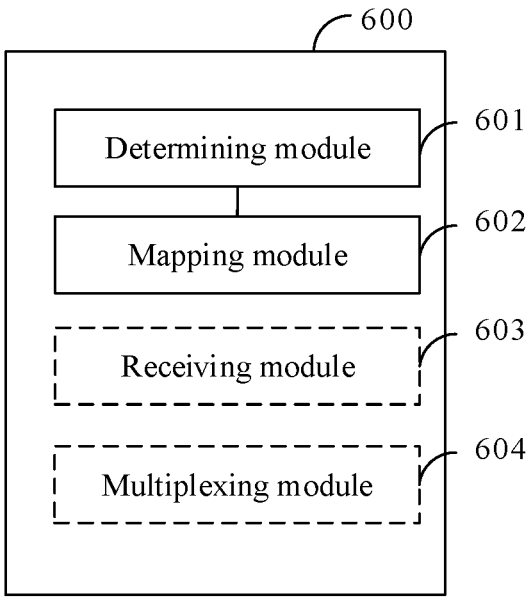
FIG. 4 is a first schematic structural diagram of a resource mapping apparatus according to an embodiment of this application.

FIG. 4 is a possible schematic structural diagram of a resource mapping apparatus according to an embodiment of this application. As shown in FIG. 4, the resource mapping apparatus 600 includes a determining module 601 and a mapping module 602. The determining module 601 is configured to determine location information of N target physical resource blocks PRBs, where the N target PRBs are frequency domain resources for a target physical uplink control channel PUCCH. The mapping module 602 is configured to map sequence information of the target PUCCH to the N target PRBs based on the location information determined by the determining module, where N is a positive integer greater than 1.

In the resource mapping apparatus according to this embodiment of the application, the resource mapping apparatus first determines the frequency domain resources for a target physical uplink control channel PUCCH, to be specific, the location information of the N target physical resource blocks PRBs or the location information of the PUCCH, where N is a positive integer greater than 1, and then maps the sequence information of the target PUCCH to the N target PRBs based on the location information of the N target PRBs, where N is a positive integer greater than 1. In this way, since the frequency domain resources used by the UE to support the PUCCH are multiple PRBs, the power of a signal transmitted by the UE is increased, thus the SNR is increased, and finally a coverage of the signal transmitted by the UE can be increased.

Optionally, in this embodiment of this application, the determining module 601 is specifically configured to determine first index information of M first PRBs, where the first index information is used to indicate location information of the M first PRBs, the M first PRBs are M PRBs in the N target PRBs, and M is a positive integer less than or equal to N; and the determining module 601 is further specifically configured to determine the location information of the N target PRBs based on the first index information.

Optionally, in this embodiment of this application, the resource mapping apparatus 600 further includes a receiving module 603. The receiving module 603 is configured to receive target information from a network-side device, where the target information is used for determining the location information of the N target PRBs; the target information includes SCS information corresponding to X SCSs; the SCS information corresponding to the X SCSs includes index information corresponding to each SCS; and the first index information is index information corresponding to a target SCS in which the UE is located in the X SCSs.

Optionally, in this embodiment of this application, the first index information includes a first index set, where the first index set includes indexes of the M first PRBs.

Optionally, in this embodiment of this application, in a case that M is less than N, the determining module 601 is further configured to determine location information of at least one second PRB based on the first index information; where the at least one second PRB is a PRB other than the M PRBs in the N target PRBs.

Optionally, in this embodiment of this application, when the frequency domain resources for the target PUCCH are dedicated PUCCH resources, the determining module 601 is specifically configured to determine second index information of the at least one the second PRB based on the first index information and first information; where the first information includes any one of the following: in a case that indexes corresponding to the N target PRBs are consecutive indexes, the number of target PRBs and relative location information of at least one of the first PRBs on the frequency domain resources for the target PUCCH; in a case that the UE is unable to know whether indexes corresponding to the N target PRBs are consecutive indexes or not, relative location information between each second PRB and at least one of the first PRBs; and in a case that the UE is unable to know whether indexes corresponding to the N target PRBs are consecutive indexes or not, target pattern information corresponding to the N target PRBs and relative location information of at least one of the first PRBs on the frequency domain resources for the target PUCCH; and the second index information is used to indicate location information of each second PRB.

Optionally, in this embodiment of this application, the receiving module 603 is further configured to receive target information from a network-side device, where the target information is used for determining the location information of the N target PRBs; the target information includes SCS information corresponding to X SCSs; the SCS information corresponding to the X SCSs includes: first location information corresponding to each SCS, and pattern information corresponding to each SCS; and the first location information corresponding to the one SCS is relative location information between the first PRB corresponding to the one SCS and the at least one second PRB.

Optionally, in this embodiment of this application, the target pattern information is: one piece of preset pattern information in at least one piece of preset pattern information configured by radio resource control RRC, specified by a protocol, or predefined.

Optionally, in this embodiment of this application, the number of the target PRBs is configured by RRC, specified by a protocol, or predefined.

Optionally, in this embodiment of this application, the relative location information between each second PRB and at least one of the first PRBs is configured by RRC, specified by a protocol, or predefined.

Optionally, in this embodiment of this application, the relative location information of the at least one of the first PRBs on the frequency domain resources for the target PUCCH is configured by RRC, specified by a protocol, or predefined.

Optionally, in this embodiment of this application, in a case that the frequency domain resources for the target PUCCH are common frequency domain resources, the determining module 601 is specifically configured to calculate first index information of the M first PRBs based on second information; where the second information includes at least one of the following: the number of CCEs in a CORESET to which a PDCCH corresponding to the target PUCCH belongs; index information of a first CCE of the PDCCH; a value of a PUCCH resource indication field in a DCI format corresponding to the PDCCH; frequency hopping indication information; a total number of cyclic shifts in an initial cyclic shift index set of the target PUCCH; the number of PRBs of a BWP on which the target PUCCH is located; and a PRB offset of a BWP on which the target PUCCH is located; where the resource indication field is used to indicate a frequency domain resource location of the target PUCCH; and the frequency hopping indication information is used to indicate whether the target PUCCH supports frequency hopping or not.

Optionally, in this embodiment of this application, in a case that the number of PRB offsets of a BWP on which the target PUCCH is located is equal to N, the first index information includes the first index set; and in a case that the number of PRB offsets of a BWP on which the target PUCCH is located is less than N, the first index information is used to indicate the location information of the M first PRBs.

Optionally, in this embodiment of this application, the first index information is predefined, specified by a protocol, or preconfigured.

Optionally, in this embodiment of this application, the mapping module 602 is specifically configured to map to the N target PRBs in a preset manner based on a sequence length of the sequence information of the target PUCCH and the location information.

Optionally, in this embodiment of this application, in a case that the sequence length of the sequence information of the target PUCCH is equal to the number of REs of the N target PRBs, the preset manner includes: mapping the sequence information to the resource elements REs of the N target PRBs in a one-to-one manner based on the sequence length of the sequence information; and in a case that the sequence length of the sequence information of the target PUCCH is equal to the number of REs of each target PRB, the preset manner includes any one of the following: performing mapping repetition on the N target PRBs, performing cyclic shift on the N target PRBs, and performing phase rotation between some PRBs of the N target PRBs; where one of the some PRBs includes some REs of the target PRB.

Optionally, in this embodiment of this application, in a case that the target PUCCH is in format 0, the resource mapping apparatus 600 further includes a multiplexing module 604. The multiplexing module 604 is configured to add a target DMRS, and multiplex the target DMRS and the target PUCCH in frequency domain; where in a case that the sequence length of the sequence information of the target PUCCH is equal to the number of REs of the N target PRBs that is obtained after exclusion of the target DMRS, the preset manner includes: mapping the sequence information to the REs of the N target PRBs in a one-to-one manner based on the sequence length of the sequence information; and in a case that the sequence length of the sequence information of the target PUCCH is equal to the number of REs of each target PRB that is obtained after exclusion of the target DMRS, the preset manner includes any one of the following: performing mapping repetition on the N target PRBs, performing cyclic shift on the N target PRBs, and performing phase rotation between some PRBs of the N target PRBs; where one of the some PRBs includes some REs of the target PRB.

Optionally, in this embodiment of this application, the sequence length of the sequence information of the target PUCCH is configured by RRC, fixed, or predefined.

Optionally, in this embodiment of this application, in a case that the target PUCCH is in format 0, the resource mapping apparatus 600 further includes a multiplexing module 604. The multiplexing module 604 is configured to: add a target demodulation reference signal DMRS, and multiplex the target DMRS and the target PUCCH in time domain.

Optionally, in this embodiment of this application, the resource mapping apparatus 600 further includes a receiving module 603. The receiving module 603 is configured to receive target information from a network-side device, where the target information is used for determining the preset manner in a case that the sequence length of the sequence information of the target PUCCH is equal to the number of REs of each target PRB; the target information includes SCS information corresponding to X SCSs; and the SCS information corresponding to the X SCSs includes a preset manner corresponding to each SCS; and the preset manner is a preset manner corresponding to a target SCS in which the UE is located in the X SCSs; and mapping to the N target PRBs in the preset manner based on a sequence length of the sequence information of the target PUCCH and the location information.

Figure 5:
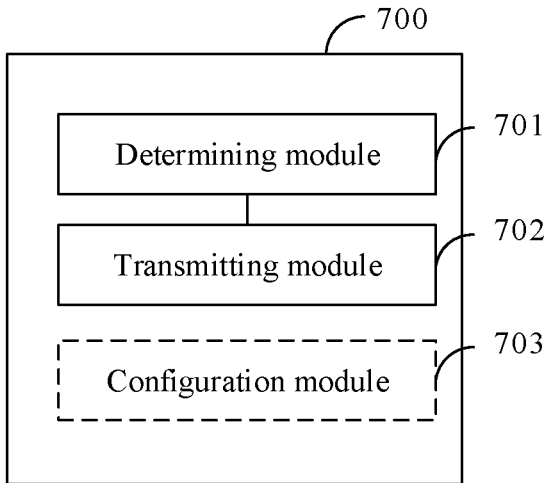
FIG. 5 is a second schematic structural diagram of a resource mapping apparatus according to an embodiment of this application.

FIG. 5 is a possible schematic structural diagram of a resource mapping apparatus according to an embodiment of this application. As shown in FIG. 5, the resource mapping apparatus 700 includes a determining module 701 and a transmitting module 702. The determining module 701 is configured to determine target information. The transmitting module 702 is configured to transmit the target information determined by the determining module 701 to UE. The target information is used for determining location information of N target PRBs; the N target PRBs are frequency domain resources for the target PUCCH; the target information includes PRB information of the N target PRBs; the PRB information includes at least one of the following: target pattern information corresponding to the N target PRBs, an index set of indexes of the N target PRBs, and relative location relationship between M first PRBs and at least one second PRB; the N target PRBs include the M first PRBs and the at least one second PRB; and relative location information of at least one of the first PRBs on the frequency domain resources for the target PUCCH.

In the resource mapping apparatus according to this embodiment of this application, the resource mapping apparatus determines the target information, and then transmits the target information to the UE, such that the UE can accurately determine the location information of the N target PRBs after receiving the target information.

Optionally, in this embodiment of this application, the target information includes SCS information corresponding to X SCSs; and each piece of SCS information includes PRB information of the N target PRBs; where the SCS information corresponding to the X SCSs includes any one of the following: index information corresponding to each SCS, first location information corresponding to each SCS, and pattern information corresponding to each SCS; where the first location information corresponding to the one SCS is relative location information between the first PRB corresponding to the one SCS and the at least one second PRB.

Optionally, in this embodiment of this application, the index set is an index set of SCSs corresponding to the target PUCCH, and the index set is a common index set for all UEs or a cell-level index set.

Optionally, in this embodiment of this application, the transmitting module 702 is specifically configured to transmit the index set of the N target PRBs to the UE in a broadcast manner.

Optionally, in this embodiment of this application, the resource mapping apparatus 700 further includes a configuration module 703. The configuration module 703 is configured to configure a sequence length of sequence information of the target PUCCH for the UE; where the sequence length is used for determining the location information of the N target PRBs.

Optionally, in this embodiment of this application, the resource mapping apparatus 700 further includes a configuration module 703. The configuration module is configured to configure the target information for the UE using RRC.

The resource mapping apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine or the like, which are not specifically limited in the embodiments of this application.

The resource mapping apparatus in this embodiment of this application may be an apparatus having an operating system. The operating system may be an Android operating system, may be an iOS operating system, or may be other possible operating systems. This is not specifically limited in the embodiments of this application.

The resource mapping apparatus provided in this embodiment of this application can implement the processes implemented by the method embodiments in FIG. 2 and FIG. 3. To avoid repetition, details are not described herein again.

Figure 6:
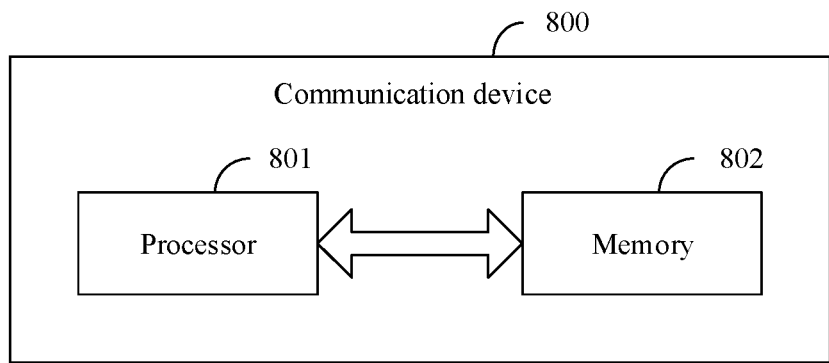
FIG. 6 is a schematic structural diagram of a communication device according to an embodiment of the present invention.

Optionally, as shown in FIG. 6, an embodiment of this application further provides a communication device 800 including a processor 801, a memory 802, and a program or instructions stored in the memory 802 and capable of running on the processor 801. For example, in a case that the communication device 800 is a terminal, when the program or instructions are executed by the processor 801, the processes of the foregoing embodiment of the resource mapping method are implemented, with the same technical effects achieved. In a case that the communication device 800 is a network-side device, when the program or instructions are executed by the processor 801, the processes of the foregoing embodiment of the resource mapping method are implemented, with the same beneficial effects achieved. To avoid repetition, details are not described herein again.

Figure 7:
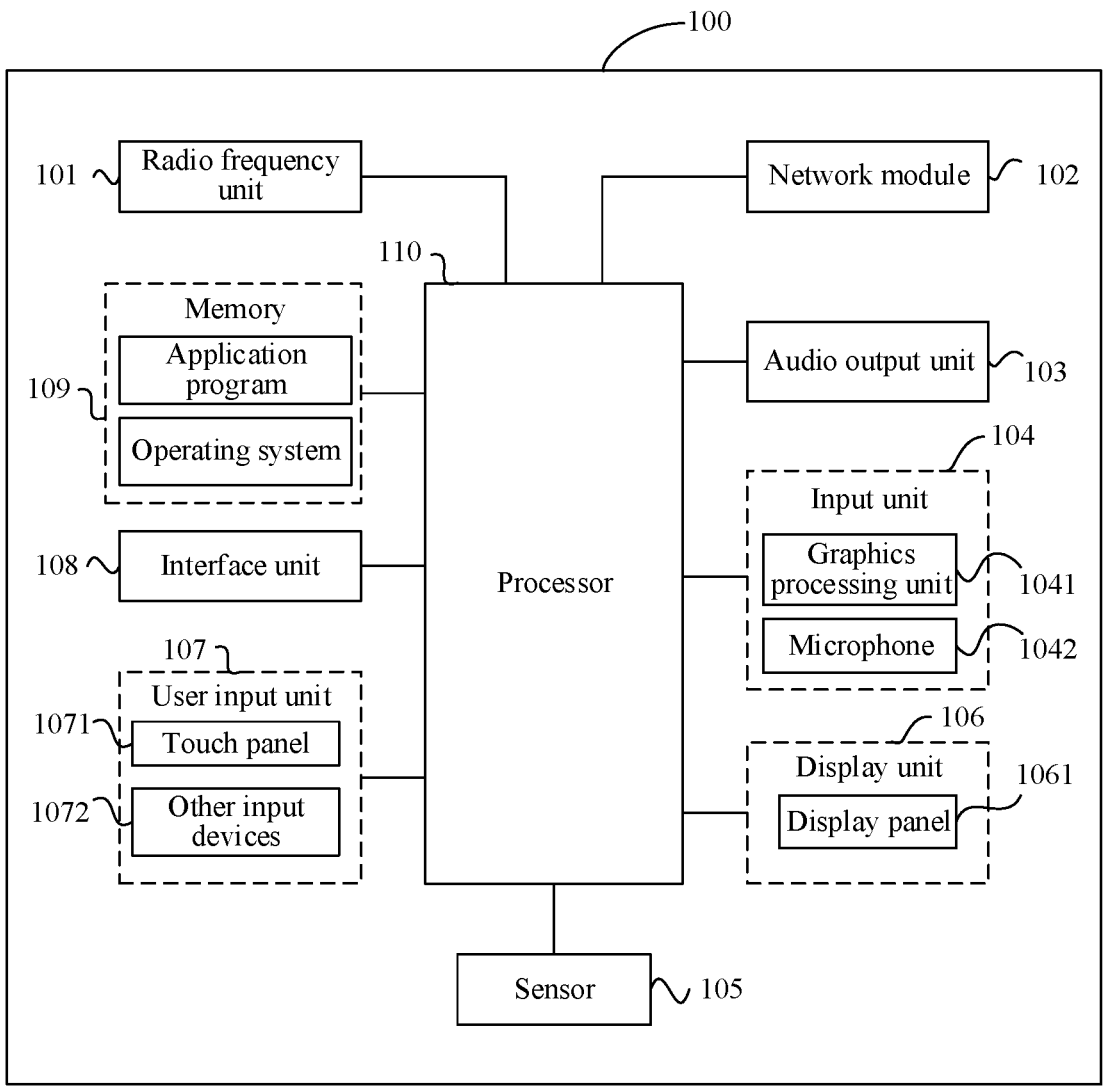
FIG. 7 is a schematic structural diagram of hardware of a terminal according to an embodiment of the present invention.

FIG. 7 is a schematic diagram of a hardware structure of a terminal for implementing the embodiments of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

It can be understood by those skilled in the art that the terminal 100 may further include a power supply (for example, a battery) supplying power to the components. The power supply may be logically connected to the processor 110 via a power management system, so that functions such as charge management, discharge management, and power consumption management are implemented by using the power management system. The structure of the terminal shown in FIG. 7 does not constitute any limitation on the terminal, and the terminal may include more or fewer components than shown in the figure, or combine some of the components, or have different arrangements of the components. Details are not described herein.

It should be understood that in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in an image capture mode or a video capture mode. The display unit 106 may include a display panel 1061. The display panel 1061 may be configured in a form of a liquid crystal display, an organic light-emitting diode display, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function button (for example, a volume control button or a power on/off button), a trackball, a mouse, and a joystick. Details are not described herein.

In this embodiment of this application, the radio frequency unit 101 transmits downlink data received from a network-side device to the processor 110 for processing, and in addition, transmits uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may mainly include a program or instruction storage area and a data storage area. The program or instruction storage area may store an operating system, an application program or instructions required for at least one function (for example, a sound play function and an image play function), and the like. Further, the memory 109 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other volatile solid-state storage device.

The processor 110 may include one or more processing units. Optionally, an application processor and a modem processor may be integrated in the processor 110. The application processor mainly processes an operating system, a user interface, an application program or instructions, and the like. The modem processor, such as a baseband processor, mainly processes wireless communication. It can be understood that the modem processor may alternatively be not integrated in the processor 110.

In a case that the terminal is user equipment UE, the processor 110 is configured to determine location information of N target physical resource blocks PRBs, where the N target PRBs are frequency domain resources for a target physical uplink control channel PUCCH; and the processor 110 is further configured to map sequence information of the target PUCCH to the N target PRBs based on the location information, where N is a positive integer greater than 1.

The terminal provided in this embodiment of this application first determines frequency domain resources for a target physical uplink control channel PUCCH, to be specific, location information of N target physical resource blocks PRBs or location information of the PUCCH, where N is a positive integer greater than 1, and then maps sequence information of the target PUCCH to the N target PRBs based on the location information of the N target PRBs, where N is a positive integer greater than 1. In this way, since the frequency domain resources used by the UE to support the PUCCH are multiple PRBs, the power of a signal transmitted by the UE is increased, thus the SNR is increased, and finally a coverage of the signal transmitted by the UE can be increased.

Optionally, the processor 110 is specifically configured to determine first index information of M first PRBs, where the first index information is used to indicate location information of the M first PRBs, the M first PRBs are M PRBs in the N target PRBs, and M is a positive integer less than or equal to N; and the processor 110 is further specifically configured to determine the location information of the N target PRBs based on the first index information.

Optionally, the radio frequency unit 101 is configured to receive target information from a network-side device, where the target information is used for determining the location information of the N target PRBs, the target information includes SCS information corresponding to X SCSs; the SCS information corresponding to the X SCSs includes index information corresponding to each SCS; and the first index information is index information corresponding to a target SCS in which the UE is located in the X SCSs.

Optionally, in a case that M is less than N, the processor 110 is further configured to determine location information of at least one second PRB based on the first index information; where the at least one second PRB is a PRB other than the M PRBs in the N target PRBs.

Optionally, in a case that the frequency domain resources for the target PUCCH are dedicated PUCCH resources, the processor 110 is specifically configured to determine second index information of the at least one second PRB based on the first index information and first information; where the first information includes any one of the following: in a case that indexes corresponding to the N target PRBs are consecutive indexes, the number of target PRBs and relative location information of at least one of the first PRBs on the frequency domain resources for the target PUCCH; in a case that the UE is unable to know whether indexes corresponding to the N target PRBs are consecutive indexes or not, relative location information between each second PRB and at least one of the first PRBs; and in a case that the UE is unable to know whether indexes corresponding to the N target PRBs are consecutive indexes or not, target pattern information corresponding to the N target PRBs and relative location information of at least one of the first PRBs on the frequency domain resources for the target PUCCH; and the second index information is used to indicate location information of each second PRB.

Optionally, the radio frequency unit 101 is further configured to receive target information from the network-side device, where the target information is used for determining the location information of the N target PRBs; the target information includes SCS information corresponding to X SCSs; the SCS information corresponding to the X SCSs includes: first location information corresponding to each SCS, and pattern information corresponding to each SCS; and the first location information corresponding to one of the SCSs is relative location information between the first PRB corresponding to the one SCS and the at least one second PRB.

Optionally, when the frequency domain resources for the target PUCCH are common frequency domain resources, the processor 110 is configured to calculate first index information of the M first PRBs based on second information; where the second information includes at least one of the following: the number of CCEs in a CORESET to which a PDCCH corresponding to the target PUCCH belongs; index information of a first CCE of the PDCCH; a value of a PUCCH resource indication field in a DCI format corresponding to the PDCCH; frequency hopping indication information; a total number of cyclic shifts in an initial cyclic shift index set of the target PUCCH; the number of PRBs of a BWP on which the target PUCCH is located; and a PRB offset of a BWP on which the target PUCCH is located; where the resource indication field is used to indicate a frequency domain resource location of the target PUCCH; and the frequency hopping indication information is used to indicate whether the target PUCCH supports frequency hopping or not.

Optionally, the processor 110 is specifically configured to map to the N target PRBs in a preset manner based on a sequence length of the sequence information of the target PUCCH and the location information.

Optionally, in a case that the target PUCCH is in format 0, the processor 110 is further configured to: add a target DMRS, and multiplex the target DMRS and the target PUCCH in frequency domain; where in a case that the sequence length of the sequence information of the target PUCCH is equal to the number of REs of the N target PRBs that is obtained after exclusion of the target DMRS, the preset manner includes: mapping the sequence information to the REs of the N target PRBs in a one-to-one manner based on the sequence length of the sequence information; and in a case that the sequence length of the sequence information of the target PUCCH is equal to the number of REs of each target PRB that is obtained after exclusion of the target DMRS, the preset manner includes any one of the following: performing mapping repetition on the N target PRBs, performing cyclic shift on the N target PRBs, and performing phase rotation between some PRBs of the N target PRBs; where one of the some PRBs includes some REs of the target PRB.

Optionally, in a case that the target PUCCH is in format 0, the processor 110 is configured to: add a target demodulation reference signal DMRS, and multiplex the target DMRS and the target PUCCH in time domain.

Optionally, the radio frequency unit 101 is configured to receive target information from a network-side device, where the target information is used for determining the preset manner in a case that the sequence length of the sequence information of the target PUCCH is equal to the number of REs of each target PRB; the target information includes SCS information corresponding to X SCSs; and the SCS information corresponding to the X SCSs includes a preset manner corresponding to each SCS; and the preset manner is a preset manner corresponding to a target SCS in which the UE is located in the X SCSs; and mapping to the N target PRBs in the preset manner based on a sequence length of the sequence information of the target PUCCH and the location information.

Figure 8:
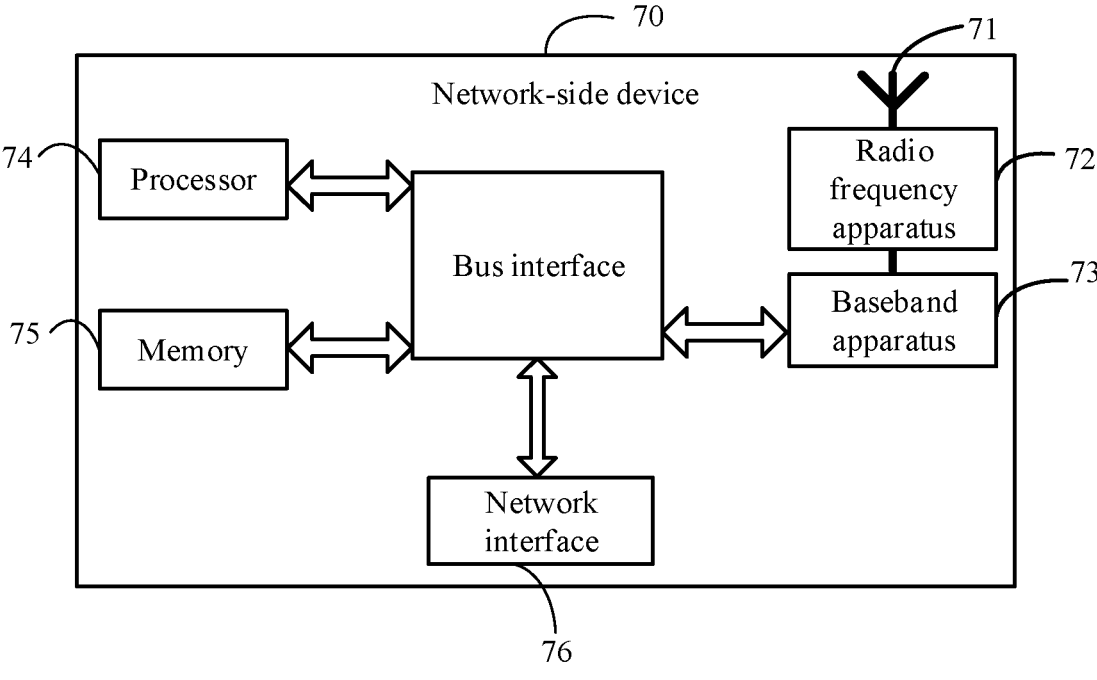
FIG. 8 is a schematic structural diagram of hardware of a network-side device according to an embodiment of the present invention.

Specifically, an embodiment of this application further provides a network-side device. As shown in FIG. 8, the network-side device 70 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and transmits the received information to the baseband apparatus 73 for processing. In a downlink direction, the baseband apparatus 73 processes to-be-transmitted information, and transmits the information to the radio frequency apparatus 72; and the radio frequency apparatus 72 processes the received information and then transmits the information by using the antenna 71.

The method performed by the network-side device in the foregoing embodiment may be implemented in the baseband apparatus 73, and the baseband apparatus 73 includes a processor 74 and a memory 75.

The baseband apparatus 73 may include, for example, at least one baseband processing unit, where a plurality of chips are disposed on the baseband processing unit. As shown in FIG. 8, one of the chips is, for example, the processor 74, and connected to the memory 75, to invoke the program in the memory 75 to perform the operations of the network device shown in the foregoing method embodiment.

The baseband apparatus 73 may further include a network interface 76 configured to exchange information with the radio frequency apparatus 72, where the interface is, for example, a common public radio interface (CPRI for short).

Specifically, the network-side device in this embodiment of the present invention further includes instructions or a program stored in the memory 75 and capable of running on the processor 74. The processor 74 invokes the instructions or program in the memory 75 to perform the method performed by the modules shown in FIG. 8, with the same technical effects achieved. To avoid repetition, details are not described herein again.

In the network-side device, the processor 74 is configured to determine target information. The radio frequency apparatus 72 is configured to transmit the target information to UE. The target information is used for determining location information of N target PRBs; the N target PRBs are frequency domain resources for the target PUCCH; the target information includes PRB information of the N target PRBs; the PRB information includes at least one of the following: target pattern information corresponding to the N target PRBs, an index set of indexes of the N target PRBs, and relative location relationship between M first PRBs and at least one second PRB; and the N target PRBs include the M first PRBs and the at least one second PRB, and relative location information of at least one of the first PRBs on the frequency domain resources for the target PUCCH.

The network-side device provided in this embodiment of this application determines the target information, and then transmits the target information to the UE, such that the UE can accurately determine the location information of the N target PRBs after receiving the target information.

Optionally, the radio frequency apparatus 72 is specifically configured to transmit the index set of the N target PRBs to the UE in a broadcast manner.

Optionally, the processor 74 is configured to configure a sequence length of sequence information of the target PUCCH for the UE; where the sequence length is used for determining the location information of the N target PRBs.

Optionally, the radio frequency apparatus 72 is configured to configure the target information for the UE using RRC.

An embodiment of this application further provide a readable storage medium, where the readable storage medium stores a program or instructions, and when the program or instructions are executed by a processor, the processes of the foregoing resource mapping method embodiments are implemented, with the same technical effects achieved. To avoid repetition, details are not described herein again.

The processor is the processor in the terminal described in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network-side device to implement the processes of the foregoing resource mapping method embodiments, with the same technical effects achieved. To avoid repetition, details are not described herein again.

It should be understood that the chip in the embodiments of this application may also be referred to as a system-level chip, a system chip, a chip system, a system on chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from that described, and various steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A resource mapping method, wherein the method comprises:

determining, by user equipment UE, location information of N target physical resource blocks PRBs, wherein the N target PRBs are frequency domain resources for a target physical uplink control channel PUCCH; and mapping, by the user equipment UE, sequence information of the target PUCCH to the N target PRBs based on the location information, wherein N is a positive integer greater than 1;

wherein the mapping sequence information of the target PUCCH to the N target PRBs based on the location information comprises:

mapping, by the user equipment UE, to the N target PRBs in a preset manner based on a sequence length of the sequence information of the target PUCCH and the location information;

wherein in a case that the sequence length of the sequence information of the target PUCCH is equal to the number of REs of the N target PRBs, the preset manner comprises: mapping the sequence information to resource elements REs of the N target PRBs in a one-to-one manner based on the sequence length of the sequence information.

2. The method according to claim 1, wherein the determining location information of N target PRBs comprises:

determining, by the user equipment UE, first index information of M first PRBs, wherein the first index information is used to indicate location information of the M first PRBs, the M first PRBs are M PRBs in the N target PRBs, and M is a positive integer less than or equal to N; and determining, by the user equipment UE, the location information of the N target PRBs based on the first index information.

3. The method according to claim 2, wherein in a case that M is less than N, after the determining first index information of M first PRBs, the method further comprises:

determining, by the user equipment UE, location information of at least one second PRB based on the first index information; wherein the at least one second PRB is a PRB in the N target PRBs other than the M PRBs.

4. The method according to claim 3, wherein in a case that the frequency domain resources for the target PUCCH are dedicated PUCCH resources, the determining location information of at least one second PRB based on the first index information comprises:

determining, by the user equipment UE, second index information of the at least one second PRB based on the first index information and first information; wherein the first information comprises any one of the following:

in a case for the user equipment UE that indexes corresponding to the N target PRBs are consecutive indexes, the number of the target PRBs and relative location information of at least one of the first PRBs on the frequency domain resources for the target PUCCH;

in a case for the user equipment UE that the UE is unable to know whether indexes corresponding to the N target PRBs are consecutive indexes or not, relative location information between each second PRB and at least one of the first PRBs; and in a case for the user equipment UE that the UE is unable to know whether indexes corresponding to the N target PRBs are consecutive indexes or not, target pattern information corresponding to the N target PRBs and relative location information of at least one of the first PRBs on the frequency domain resources for the target PUCCH; and the second index information is used to indicate location information of each second PRB.

5. The method according to claim 3, wherein in a case that the frequency domain resources for the target PUCCH are common frequency domain resources, the determining first index information of M first PRBs comprises:

calculating, by the user equipment UE, the first index information of the M first PRBs based on second information; wherein the second information comprises at least one of the following:

the number of CCEs in a CORESET to which a PDCCH corresponding to the target PUCCH belongs;

index information of a first CCE of the PDCCH;

a value of a PUCCH resource indication field in a DCI format corresponding to the PDCCH;

frequency hopping indication information;

a total number of cyclic shifts in an initial cyclic shift index set of the target PUCCH;

the number of PRBs of a BWP on which the target PUCCH is located; and a PRB offset of a BWP on which the target PUCCH is located; wherein the resource indication field is used to indicate a frequency domain resource location of the target PUCCH; and the frequency hopping indication information is used to indicate whether the target PUCCH supports frequency hopping or not.

6. The method according to claim 1, wherein in a case that the sequence length of the sequence information of the target PUCCH is equal to the number of REs of each target PRB, the preset manner comprises any one of the following: performing mapping repetition on the N target PRBs, performing cyclic shift on the N target PRBs, and performing phase rotation between some PRBs of the N target PRBs; wherein one of the some PRBs comprises some REs of the target PRB.

7. A resource mapping method, wherein the method comprises:

determining, by a network-side device, target information; and transmitting, by the network-side device, the target information to UE; wherein the target information is used for determining location information of N target PRBs;

the N target PRBs are frequency domain resources for the target PUCCH;

the target information comprises PRB information of the N target PRBs;

the PRB information comprises at least one of the following:

target pattern information corresponding to the N target PRBs;

an index set of indexes of the N target PRBs;

a relative location relationship between M first PRBs and at least one second PRB;

the N target PRBs comprise the M first PRBs and the at least one second PRB; and relative location information of at least one of the first PRBs on the frequency domain resources for the target PUCCH;

wherein the method further comprises:

configuring, by the network-side device, a sequence length of sequence information of the target PUCCH for the UE; wherein the sequence length is used for determining the location information of the N target PRBs.

8. The method according to claim 7, wherein the target information comprises SCS information corresponding to X subcarrier spacings SCSs; and each piece of SCS information comprises PRB information of the N target PRBs; wherein the SCS information corresponding to X SCSs comprises any one of the following:

index information corresponding to each SCS;

first location information corresponding to each SCS; and pattern information corresponding to each SCS; wherein the first location information corresponding to one of the SCSs is relative location information between the first PRB corresponding to the one SCS and the at least one second PRB.

9. The method according to claim 7, wherein the index set is an index set of SCSs corresponding to the target PUCCH, and the index set is a common index set for all UEs or a cell-level index set.

10. The method according to claim 7, wherein the transmitting the target information to UE comprises:

transmitting, by the network-side device, the index set of the N target PRBs to the UE in a broadcast manner.

11. The method according to claim 7, wherein the transmitting the target information to UE comprises:

configuring, by the network-side device, the target information for the UE using RRC.

12. A terminal, comprising a processor, a memory, and a program or instructions stored in the memory and capable of running on the processor, wherein when the program or instructions are executed by the processor, implementing:

determining, by user equipment UE, location information of N target physical resource blocks PRBs, wherein the N target PRBs are frequency domain resources for target physical uplink control channel PUCCH; and mapping, by the user equipment UE, sequence information of the target PUCCH to the N target PRBs based on the location information, wherein N is a positive integer greater than 1;

wherein the mapping sequence information of the target PUCCH to the N target PRBs based on the location information comprises:

mapping, by the user equipment UE, to the N target PRBs in a preset manner based on a sequence length of the sequence information of the target PUCCH and the location information;

wherein in a case that the sequence length of the sequence information of the target PUCCH is equal to the number of REs of the N target PRBs, the preset manner comprises: mapping the sequence information to resource elements REs of the N target PRBs in a one-to-one manner based on the sequence length of the sequence information.

13. The terminal according to claim 12, wherein the determining location information of N target PRBs comprises:

determining, by the user equipment UE, first index information of M first PRBs, wherein the first index information is used to indicate location information of the M first PRBs, the M first PRBs are M PRBs in the N target PRBs, and M is a positive integer less than or equal to N; and determining, by the user equipment UE, the location information of the N target PRBs based on the first index information.

14. The terminal according to claim 13, wherein in a case that M is less than N, after the determining first index information of M first PRBs, the terminal further implements:

determining, by the user equipment UE, location information of at least one second PRB based on the first index information; wherein the at least one second PRB is a PRB in the N target PRBs other than the M PRBs.

15. The terminal according to claim 14, wherein in a case that the frequency domain resources for the target PUCCH are dedicated PUCCH resources, the determining location information of at least one second PRB based on the first index information comprises:

determining, by the user equipment UE, second index information of the at least one second PRB based on the first index information and first information; wherein the first information comprises any one of the following:

in a case for the user equipment UE that indexes corresponding to the N target PRBs are consecutive indexes, the number of the target PRBs and relative location information of at least one of the first PRBs on the frequency domain resources for the target PUCCH;

in a case for the user equipment UE that the UE is unable to know whether indexes corresponding to the N target PRBs are consecutive indexes or not, relative location information between each second PRB and at least one of the first PRBs; and in a case for the user equipment UE that the UE is unable to know whether indexes corresponding to the N target PRBs are consecutive indexes or not, target pattern information corresponding to the N target PRBs and relative location information of at least one of the first PRBs on the frequency domain resources for the target PUCCH; and the second index information is used to indicate location information of each second PRB.

16. The terminal according to claim 14, wherein in a case that the frequency domain resources for the target PUCCH are common frequency domain resources, the determining first index information of M first PRBs comprises:

calculating, by the user equipment UE, the first index information of the M first PRBs based on second information; wherein the second information comprises at least one of the following:

the number of CCEs in a CORESET to which a PDCCH corresponding to the target PUCCH belongs;

index information of a first CCE of the PDCCH;

a value of a PUCCH resource indication field in a DCI format corresponding to the PDCCH;

frequency hopping indication information;

a total number of cyclic shifts in an initial cyclic shift index set of the target PUCCH;

the number of PRBs of a BWP on which the target PUCCH is located; and a PRB offset of a BWP on which the target PUCCH is located; wherein the resource indication field is used to indicate a frequency domain resource location of the target PUCCH; and the frequency hopping indication information is used to indicate whether the target PUCCH supports frequency hopping or not.

17. The terminal according to claim 12, wherein in a case that the sequence length of the sequence information of the target PUCCH is equal to the number of REs of each target PRB, the preset manner comprises any one of the following: performing mapping repetition on the N target PRBs, performing cyclic shift on the N target PRBs, and performing phase rotation between some PRBs of the N target PRBs; wherein one of the some PRBs comprises some REs of the target PRB.

\* \* \* \* \*